(12) United States Patent
Bonniville

(10) Patent No.: US 8,434,805 B1
(45) Date of Patent: May 7, 2013

(54) PROTECTIVE SHIELD FOR A BUS DRIVER

(76) Inventor: Harry F. Bonniville, Sanford, FL (US)

( * ) Notice: Subject to any disclaimer, the term of this patent is extended or adjusted under 35 U.S.C. 154(b) by 0 days.

(21) Appl. No.: 13/200,540

(22) Filed: Sep. 23, 2011

(51) Int. Cl.
*B60N 2/44* (2006.01)

(52) U.S. Cl.
USPC .......... 296/24.4; 296/178; 296/68.1; 280/749

(58) Field of Classification Search ................. 296/24.4, 296/178, 22, 21, 24.36, 24.1, 24.3, 68.1; 280/749; 297/217.5, 184.4, 184.14
See application file for complete search history.

(56) References Cited

U.S. PATENT DOCUMENTS

| | | | |
|---|---|---|---|
| 1,631,357 A | 6/1927 | Blair et al. | |
| 3,377,082 A * | 4/1968 | Saunders | ...................... 280/751 |
| 4,227,735 A | 10/1980 | Joyner | |
| 4,235,470 A | 11/1980 | Kauss et al. | |
| 4,621,856 A * | 11/1986 | McKenzie | .................... 296/24.4 |
| 4,826,245 A * | 5/1989 | Entratter | ..................... 297/217.5 |
| 5,096,214 A | 3/1992 | Walker et al. | |
| 5,857,745 A * | 1/1999 | Matsumiya | .............. 297/354.13 |
| 6,517,135 B2 | 2/2003 | de Gaillard | |
| D549,153 S | 8/2007 | Brown | |
| 7,322,626 B2 * | 1/2008 | Thomas | ....................... 296/24.3 |
| 2001/0033084 A1 | 10/2001 | Murray et al. | |

FOREIGN PATENT DOCUMENTS

| | | | |
|---|---|---|---|
| JP | 63071443 | * | 3/1988 |
| JP | 7-246957 | * | 9/1995 |

* cited by examiner

*Primary Examiner* — Dennis Pedder
(74) *Attorney, Agent, or Firm* — Richard L Miller

(57) ABSTRACT

A protective shield for a bus driver which comprises a partition. A mechanism is for mounting the partition onto a floor and about a seat of the bus driver to protect the bus driver while operating a bus.

4 Claims, 5 Drawing Sheets

PROTECTIVE SHIELD FOR A BUS DRIVER

BACKGROUND OF THE INVENTION

1. Field of the Invention

The present invention relates to a protection device, and more particularly, a protective shield for a bus driver.

2. Description of the Prior Art

Numerous innovations for protective enclosures for drivers have been provided in the prior art that will be described. Even though these innovations may be suitable for the specific individual purposes to which they address, however, they differ from the present invention.

A FIRST EXAMPLE, U.S. Pat. No. 1,631,357, Issued on Jun. 7, 1927, to Blair et al. teaches in a vehicle, a driver's enclosure comprising a partition including a wall situated rearward of the driver's seat, the wall having a sight opening intermediate of its height, a vertically slidable panel having a glazed portion and an opaque portion, either of which may be brought into juxtaposition with the sight opening by the sliding of the panel, and means for retaining the panel in either position to which it may be moved.

A SECOND EXAMPLE, U.S. Pat. No. 4,227,735, Issued on Oct. 14, 1980, to Joyner teaches a protective enclosure for a bus driver which includes a back wall fabricated from steel and secured to the inner walls of a bus by means of suitable angle irons or braces. A main support column is secured to the back wall at the other end. The back wall has a central area fabricated from a relatively impenetrable transparent material. A side section extends at right angles to the back wall and includes a door for gaining access to the enclosure. The door can be operated by means of a push bar located on the inside of the enclosure to enable a driver to exit the enclosure. The door also contains relatively large glass areas to provide an unobstructed view both to the driver and the passengers. Other features which include two-way communications and emergency devices are also disclosed.

A THIRD EXAMPLE, U.S. Pat. No. 4,235,470, Issued on Nov. 25, 1980, to Kauss et al. teaches a utility vehicle with a self-contained driver compartment and with spring and damping elements by which the driver compartment is elastically supported on the rest of the vehicle mass. Located centrally between the driver compartment and the rest of the vehicle there is provided a guide arrangement which guides the driver compartment in all its motions relative to the rest of the vehicle and which consists of a vertical guide as well as two rotating guides coupled with it, their pivot axes being in the vehicle's longitudinal direction and transverse to it.

A FOURTH EXAMPLE, U.S. Pat. No. 5,096,214, Issued on Mar. 17, 1992, to Walker et al. teaches a portable enclosure which is suitable for use as a portable bus stop or the like and includes a frame constructed of plastic pipe, a canopy covering the top and bottom portions of the frame and a clear plastic window area located in the center section of the frame between the canopy segments, for viewing purposes. The portable enclosure is fitted with a pair of wheels and a handle positioned above the wheels for transportation purposes and includes a door for ingress and egress and a seat for accommodating the occupant or occupants.

A FIFTH EXAMPLE, U.S. Patent Office Publication No. 2001/0033084, Published on Oct. 25, 2001, to Murray et al. teaches a protective shield that prevents flying objects from striking a school bus driver. The protective shield has a plastic mesh body that allows unobstructed viewing of the occupants on a school bus. The school bus driver shield can be readily installed and removed. The protective shield is strong, durable, and lightweight.

A SIXTH EXAMPLE, U.S. Pat. No. 6,517,135, Issued on Feb. 11, 2003, to de Gaillard teaches a motor vehicle with a convertible passenger compartment formed from a fixed front section which has the motor vehicle roof and a rear movable sliding module which is movably supported on the body and can be moved to vary the size of the passenger compartment relative to the fixed front section between a short position and a long position.

A SEVENTH EXAMPLE, U.S. Pat. No. D549,153, Issued on Aug. 21, 2007, to Brown teaches a ornamental design for a bus driver door shield, as shown and described. It is apparent now that numerous innovations for protective enclosures for drivers have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a protective shield for a bus driver that avoids the disadvantages of the prior art.

ANOTHER OBJECT of the present invention is to provide a protective shield for a bus driver that is simple and inexpensive to manufacture.

STILL ANOTHER OBJECT of the present invention is to provide a protective shield for a bus driver that is simple to use.

BRIEFLY STATED, STILL YET ANOTHER OBJECT of the present invention is to provide a protective shield for a bus driver which comprises a partition. A mechanism is for mounting the partition onto a floor and about a seat of the bus driver to protect the bus driver while operating a bus.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
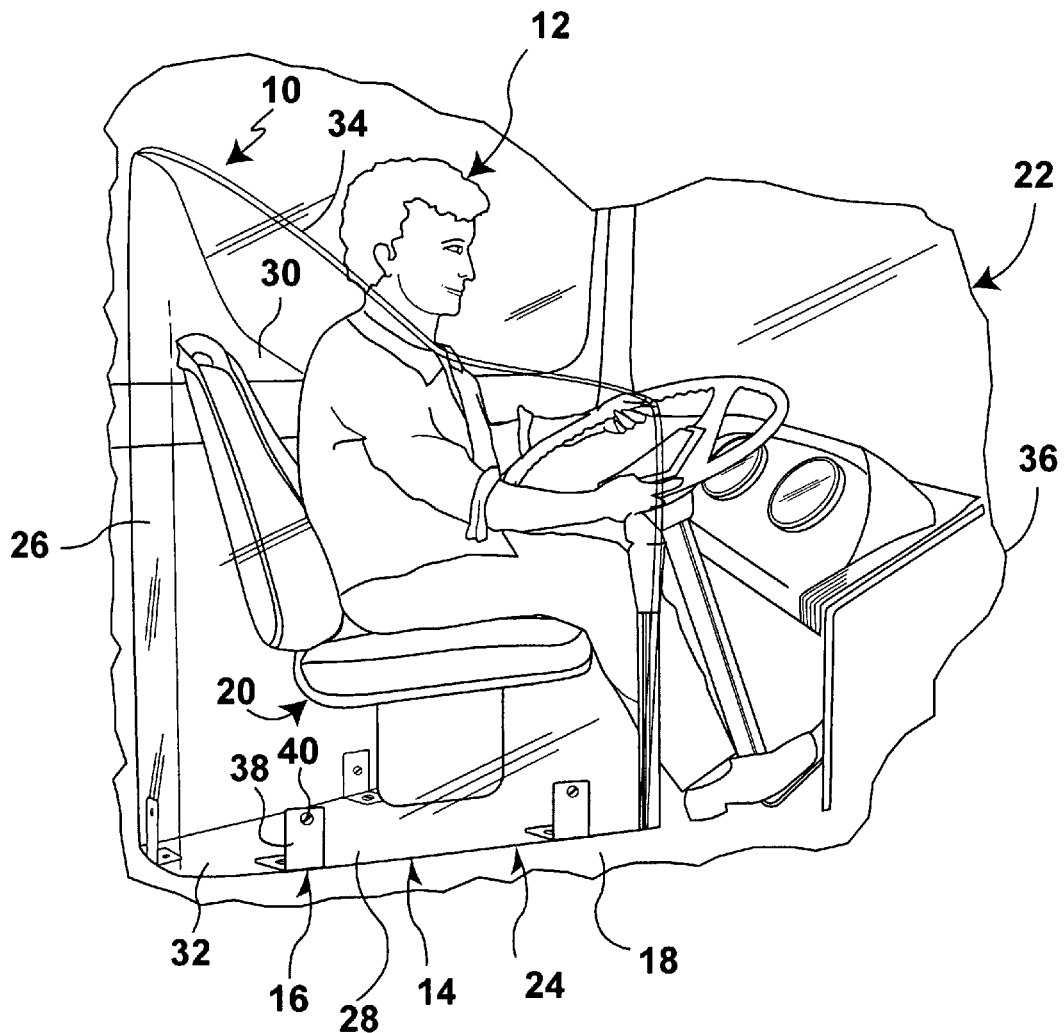
FIG. 1 is a diagrammatic perspective view with parts broken away, showing an embodiment of the present invention in use.
Figure 2:
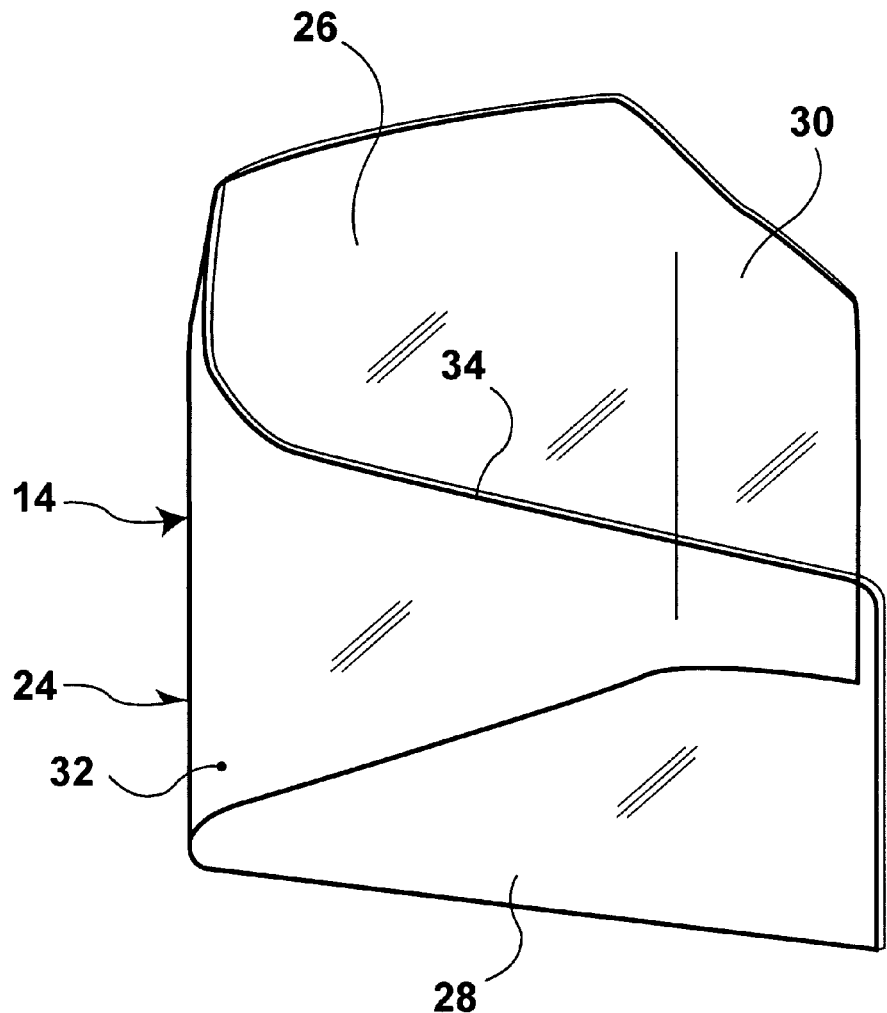
FIG. 2 is a diagrammatic perspective view, showing just the partition of the present invention.

A MARSHALING OF REFERENCE NUMERALS UTILIZED IN THE DRAWING 10 protective shield
12 bus driver
14 partition of protective shield 10
16 mounting mechanism of protective shield 10

18 floor of bus 22
20 seat of bus driver 12
22 bus
24 one piece panel for partition 14
26 rear portion of one piece panel 24
28 outer side portion of one piece panel 24
30 inner side portion of one piece panel 24
32 solid transparent material of one piece panel 24
34 top edge of outer side portion 28
36 front of bus 22
38 L-shaped bracket of mounting mechanism 16
40 fastener of mounting mechanism 16

DETAILED DESCRIPTION OF THE PREFERRED EMBODIMENT

Figure 3:
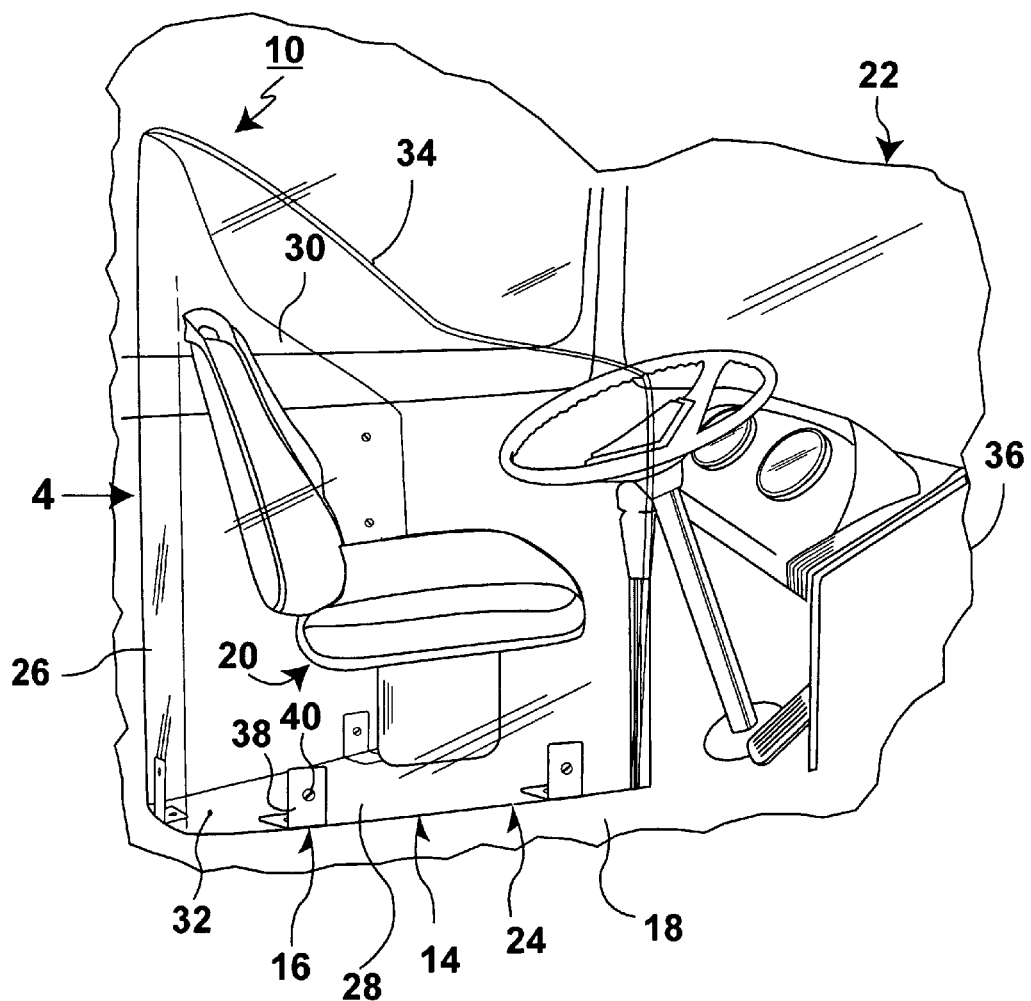
FIG. 3 is a diagrammatic perspective view similar to FIG. 1, with the bus driver removed therefrom.
Figure 4:
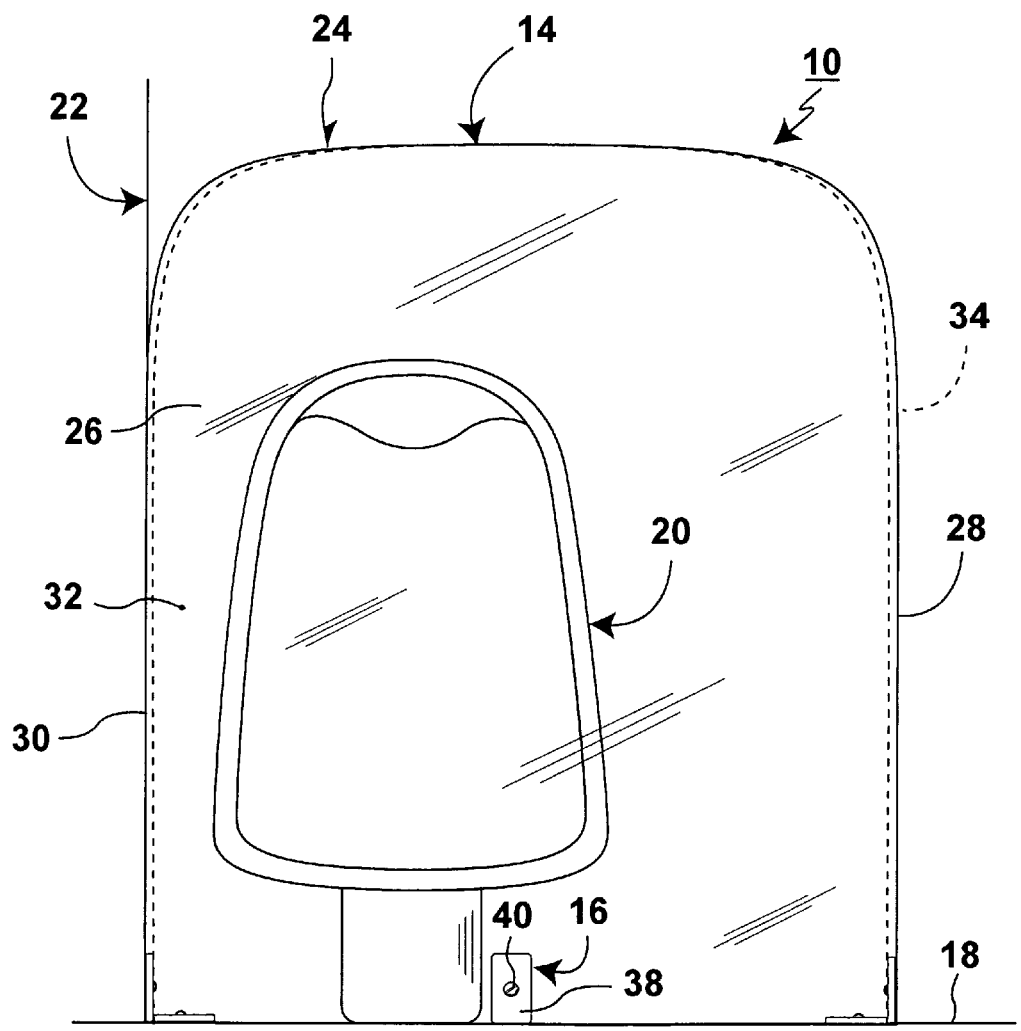
FIG. 4 is a diagrammatic rear view taken in the direction of arrow 4 in FIG. 3.
Figure 5:
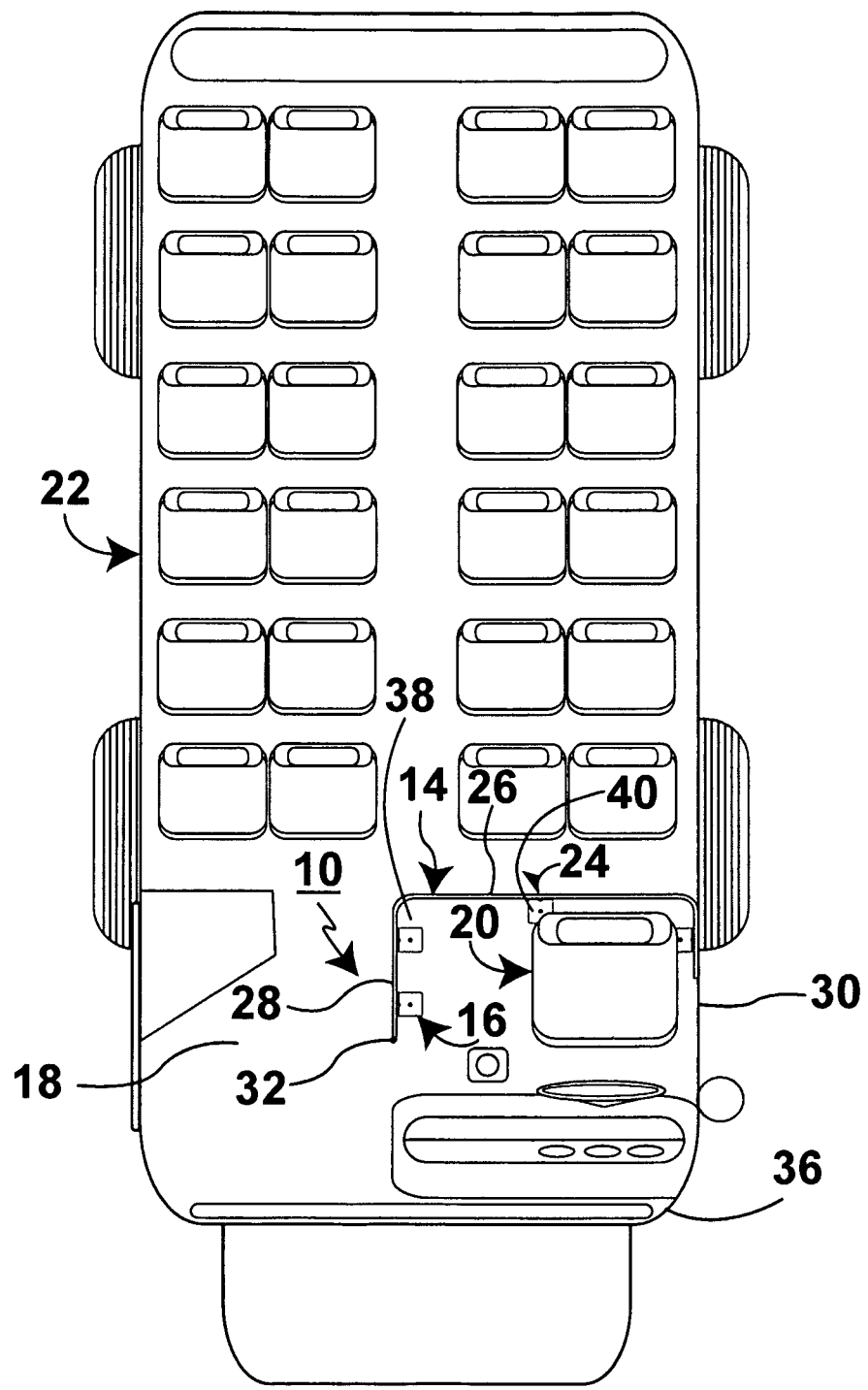
FIG. 5 is a diagrammatic top view of a bus, with the roof removed therefrom, showing the location of the present invention within the bus.

Referring now to the figures, in which like numerals indicate like parts, and particularly to FIGS. 1, through 5, which are a diagrammatic perspective view with parts broken away, showing an embodiment of the present invention in use; a diagrammatic perspective view, showing just the partition of the present invention; a diagrammatic perspective view similar to FIG. 1, with the bus driver removed therefrom; a diagrammatic rear view taken in the direction of arrow 4 in FIG. 3; and a diagrammatic top view of a bus, with the roof removed therefrom, showing the location of the present invention within the bus, and as such, will be discussed with reference thereto.

The present invention is a protective shield 10 for a bus driver 12 which comprises a partition 14. A mechanism 16 is for mounting the partition 14 onto a floor 18 and about a seat 20 of the bus driver 12, to protect the bus driver 12 while operating a bus 22.

The partition 14 is comprised out of a one piece panel 24 formed in a generally U-shaped configuration, having a rear portion 26 and two side portions 28,30 to extend around the rear and sides of the seat 20 of the bus driver 12. The one piece panel 24 is comprised out of a solid transparent material 32, so as to allow the bus driver 12 to see through said one piece panel 24 easily while being protected. The solid transparent material 32 is a polycarbonate resin thermoplastic. A top edge 34 of the outer side portion 28 of the one piece panel 24 slopes downwardly towards the front 36 of the bus 22 to allow the bus driver 12 to interact with passengers of the bus, such as to provide change and check tickets.

The mounting mechanism 16 comprises a plurality of L-shaped brackets 38 spaced apart on the floor 18 of the bus 22 against inner surfaces of the rear portion 26 and the two side portions 28,30 of the one piece panel 24. A plurality of fasteners 40 are provided to secure the L-shaped brackets 38 on the floor 18 of the bus 22 and into the rear portion 26 and the two side portions 28,30 of the one piece panel 24 to maintain the one piece panel 24 in a stationary position about the seat 20 of the bus driver 12.

It will be understood that each of the elements described above, or two or more together, may also find a useful application in other types of constructions differing from the types described above.

While the invention has been illustrated and described as embodiments of a protective shield for a bus driver, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A protective shield for a bus driver which comprises:
   a) a partition; and
   b) means for mounting said partition onto a floor and about a seat of the bus driver to protect the bus driver while operating a bus;
   wherein said partition is comprised out of a one piece panel formed in a generally U-shaped configuration, having a rear portion and two side portions to extend around the rear and sides of the seat of the bus driver; and
   wherein said mounting means comprises:
   a) a plurality of L-shaped brackets spaced apart on the floor of the bus against a surface of said rear portion and said two side portions of said one piece panel; and
   b) a plurality of fasteners to secure said L-shaped brackets on the floor of the bus and into said rear portion and said two side portions of said one piece panel to maintain said one piece panel in a stationary position about the seat of the bus driver.

2. The protective shield as recited in claim 1, wherein said one piece panel is comprised out of a solid transparent material, so as to allow the bus driver to see through said one piece panel easily while being protected.

3. The protective shield as recited in claim 2, wherein said solid transparent material, is a polycarbonate resin thermoplastic.

4. The protective shield as recited in claim 1, wherein a top edge of said outer side portion of said one piece panel slopes downwardly towards the front of the bus to allow the bus driver to interact with passengers of the bus, such as to provide change and check tickets.

* * * * *